No. 804,264. PATENTED NOV. 14, 1905.
A. C. PICCININI.
MEMBRANE OF GRAPHOPHONES, &c.
APPLICATION FILED AUG. 15, 1904.

2 SHEETS—SHEET 1.

Witnesses:
E. B. Bolton
H. M. Kuehne

Inventor:
Arturo Camilo Piccinini
By Richardson
his Attorneys.

No. 804,264. PATENTED NOV. 14, 1905.
A. C. PICCININI.
MEMBRANE OF GRAPHOPHONES, &c.
APPLICATION FILED AUG. 15, 1904.

2 SHEETS—SHEET 2.

Witnesses:
E. B. Bolton
N. M. Kuehne

Inventor:
Arturo Camilo Piccinini
By Richard G.
his Attorneys.

UNITED STATES PATENT OFFICE.

ARTURO CAMILO PICCININI, OF BUENOS AYRES, ARGENTINA.

MEMBRANE OF GRAPHOPHONES, &c.

No. 804,264.  Specification of Letters Patent.  Patented Nov. 14, 1905.

Application filed August 15, 1904. Serial No. 220,848.

*To all whom it may concern:*

Be it known that I, ARTURO CAMILO PICCININI, a citizen of the Argentine Republic, and a resident of Buenos Ayres, in the Province of Buenos Ayres, Argentine Republic, have invented certain new and useful Improvements in Graphophones, of which the following is a specification.

My said invention relates more particularly to the sound-box casing or diaphragm-support and to the stylus-support.

The objects of the invention are to provide an extremely simple and effective form of casing or diaphragm-support which may be produced at an extremely low cost, and also one in which a multiplicity of parts is avoided, and, further, to provide an extremely simple and efficient stylus-support which may be readily assembled and quickly and accurately adjusted while the graphophone is in operation.

With these and other objects in view the invention includes the various features of construction and arrangement of parts hereinafter described, and particularly pointed out in the claims.

The invention is illustrated in the accompanying drawings, in which—

Figure 1:
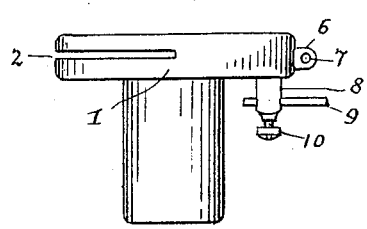
Figure 2:
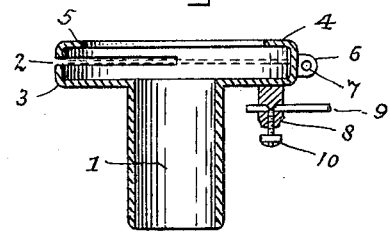
Figure 3:
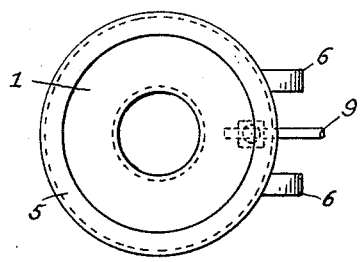
Figure 4:
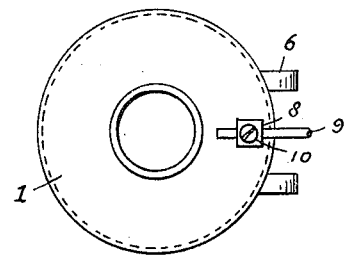
Figure 5:
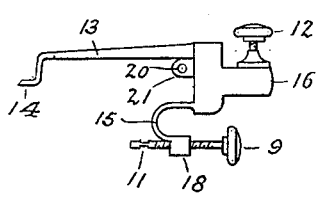
Figure 6:
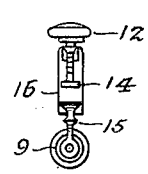
Figure 7:
Figure 8:
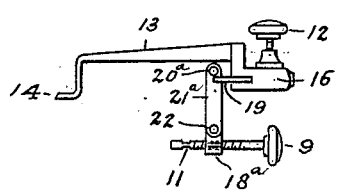
Figure 9:
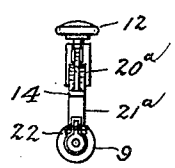
Figure 10:
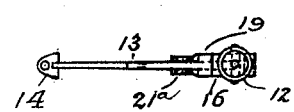
Figure 11:
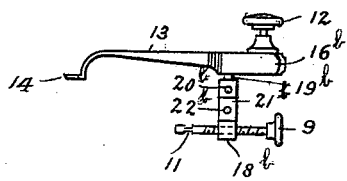
Figure 12:
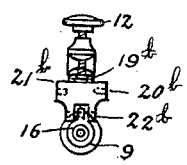
Figure 13:
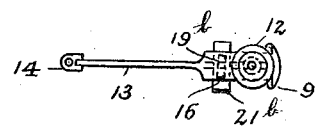
Figure 14:
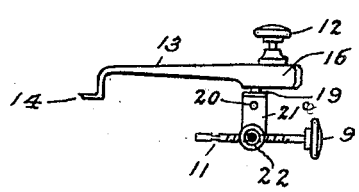
Figure 15:
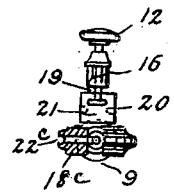
Figure 16:
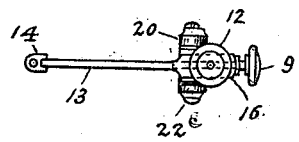
Figure 17:
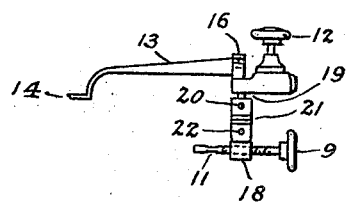
Figure 18:
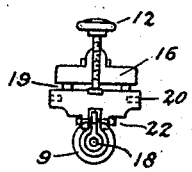
Figure 19:
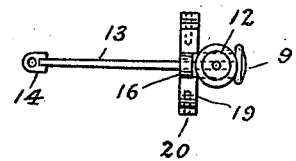
Figure 20:
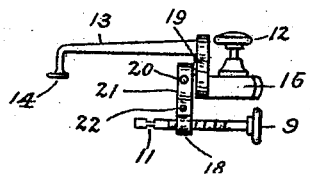
Figure 21:
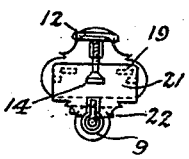
Figure 22:
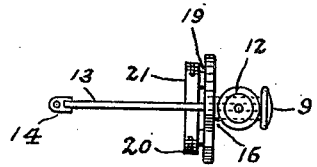

Figure 1 is a side elevation of the diaphragm-casing. Fig. 2 is a central vertical section thereof. Fig. 3 is a top plan view, and Fig. 4 a bottom plan view, of the same. Figs 5, 6, and 7 are respectively a side elevation, an end view, and a top view of the preferred form of stylus-support. Figs. 8, 9, and 10 are similar views of a modification thereof. Figs. 11, 12, and 13 are like views of still another form. Figs. 14, 15, and 16 are similar views of a further modification. Figs. 17, 18, and 19 are like views of a fifth form, and Figs. 20, 21, and 22 are similar views of a sixth form.

In the various figures the same or like parts are designated by the same reference-numerals.

Referring first to the casing, (shown in Figs. 1 to 4, both inclusive,) the ordinal 1 designates the diaphragm-casing, which is made of a single piece of sheet metal, having a lower tubular portion for connecting with the receiver and an upper enlarged portion of circular shape with substantially flat lower annular wall 3 and inwardly-extending opposing flange 5. The vertical peripheral wall between is slotted, as at 2, for one-half the circumference to permit the insertion of the diaphragm, which is clamped between rubber or like clamping-rings (not shown) which lie between the opposing walls 3 and 5. At the back of the casing are located two lugs or projections which serve to pivotally connect the stylus-support, the latter having a lug 21, provided with recesses 20, designed to be engaged by screws threaded through the lugs 6. The stylus-support—as shown in Figs. 5, 6, and 7, for example—has an arm 13, which extends inward over the diaphragm-casing and has a downwardly-turned end provided with a small plate or shoe 14, which is designed to coincide with and be secured directly to the center of the diaphragm. On the side of the stylus-support opposite the arm 13 is a projecting member 16, to which the needle or stylus is designed to be connected by a set-screw 12.

From the lower part of the stylus-support extends an arm 15, which carries at its lower end a block 18, having a threaded opening through which passes a thumb-screw 9. The forward end of this thumb-screw is unthreaded, so as to enable it to turn freely in a horizontal passage in a lug or projection 8, extending from the lower rear side of the diaphragm-casing. The screw 9 is held against longitudinal displacement in the lug 8 by a set-screw 10, threaded through the lower end of the lug and the end of which engages an annular groove 11 in the thumb-screw 9. It will thus be seen that by turning the thumb-screw 9 the block or part 18 will be caused to travel along the thumb-screw and consequently the arm 13 and stylus correspondingly adjusted.

The forms of stylus-support shown in the various modifications operate in the manner just described and differ only as to details. For instance, in the form shown in Figs. 8, 9, and 10 the portion $21^a$, which forms the pivotal connection, is in the shape of a bar which is connected by a small bracket 19 with the part 16. In this form the threaded block or part $18^a$, through which the thumb-screw passes, is pivotally connected to the part $21^a$, as shown at 22. In the form shown in Figs. 11, 12, and 13 the part $16^b$ is formed as a direct extension of the arm 13, and the part $20^b$ is connected to the under side of the part $16^b$ by pins $19^b$ and to the part $18^b$ by hinge-joint $21^b$ $22^b$. In the form shown in Figs. 14, 15, and 16 the portion $21^c$ terminates in two arms, between which the block or section $18^c$ is held by small screws $22^c$. The forms shown, respectively, in Figs. 17, 18, and 19 and Figs. 20, 21, and 22 differ only slightly in the shape of the parts 13 and 16 and their manner of connection with part 21.

Having thus described my invention, what I claim is—

1. In combination, a diaphragm-casing comprising a cylindrical portion and enlarged upper portion, the bottom of the enlarged portion being in a plane at right angles to the cylindrical portion and the top of said enlarged portion being bent to form an inwardly-extending flange lying in a plane parallel to the bottom thereof so as to form upper and lower opposing walls between which the edges of the diaphragm is clamped and a lateral inserting-opening in the wall of the enlarged portion between said upper and lower walls.

2. In combination the diaphragm-casing; having a downwardly-projecting portion connected thereto, a stylus-carrying member pivotally connected to said casing, and having a downwardly-projecting portion, and a thumb-screw carried by said portion and engaging with the portion projecting from the casing for regulating the position of the stylus-carrying member substantially as described.

3. In combination, the diaphragm-casing, the stylus-carrying member pivotally connected thereto, a downwardly-projecting part carried by said stylus-carrying member, a single thumb-screw carried thereby and a connection between the end of the screw and a part on the diaphragm-casing.

In witness whereof I have hereunto set my hand in presence of two witnesses.

ARTURO CAMILO PICCININI.

Witnesses:
I. C. MILLER,
W. M. KUEHNE.